(12) United States Patent
Bergmann et al.

(10) Patent No.: US 7,649,667 B2
(45) Date of Patent: Jan. 19, 2010

(54) CONTROLLING POCKELS CELLS

(75) Inventors: Thorald Bergmann, Murnau (DE); Rainer Flaig, Eschbronn (DE); Dirk Sutter, Rottweil (DE)

(73) Assignees: Trumpf Laser GmbH + Co., KG, Schramberg (DE); BME Messgeraete Entwicklung KG, Murnau (DE)

( * ) Notice: Subject to any disclaimer, the term of this patent is extended or adjusted under 35 U.S.C. 154(b) by 311 days.

(21) Appl. No.: 11/615,445

(22) Filed: Dec. 22, 2006

(65) Prior Publication Data

US 2008/0018977 A1 Jan. 24, 2008

(30) Foreign Application Priority Data

Dec. 22, 2005 (DE) ........................ 10 2005 061 716

(51) Int. Cl.
G02B 1/07 (2006.01)
(52) U.S. Cl. ........................ 359/257; 359/245; 359/246; 372/25
(58) Field of Classification Search ................. 359/257, 359/246, 245, 239; 372/25, 55, 57
See application file for complete search history.

(56) References Cited

U.S. PATENT DOCUMENTS

| | | | |
|---|---|---|---|
| 3,910,679 A | 10/1975 | Rushworth et al. | |
| 4,239,989 A * | 12/1980 | Brajder | 327/483 |
| 4,288,691 A | 9/1981 | Horton | |
| 4,896,119 A * | 1/1990 | Williamson et al. | 359/348 |
| 5,272,713 A | 12/1993 | Sobey et al. | |
| 5,852,621 A * | 12/1998 | Sandstrom | 372/25 |
| 5,987,042 A | 11/1999 | Staver et al. | |
| 2004/0101001 A1 | 5/2004 | Bergmann et al. | |
| 2004/0146075 A1 | 7/2004 | Kennedy et al. | |

FOREIGN PATENT DOCUMENTS

| | | |
|---|---|---|
| DE | 10251888 | 5/2004 |
| DE | 10304401 | 8/2004 |
| WO | WO 2004/068657 | 8/2004 |

OTHER PUBLICATIONS

Matsushima et al., "Single pulse switchout system for a passively mode-locked Q-switched Nd:YAG laser", Rev. Sci. Instrum., vol. 52, No. 12, Dec. 1981, pp. 1860-1864.
Nampoothiri et al., "Single pulse selection from a cw mode-locked laser", Review of Scientific Instruments, vol. 69, No. 3, Mar. 1998, pp. 1240-1242.
International Search Report from corresponding European Application No. 06026450.4, mailed May 21, 2007, 7 pages.

* cited by examiner

*Primary Examiner*—Timothy J Thompson
(74) *Attorney, Agent, or Firm*—Fish & Richardson P.C.

(57) ABSTRACT

A controllable Pockels cell system has a switching unit that can apply voltage to the Pockels cell. The Pockels cell system also features a delay unit that enables setting of a precise time when voltage is applied or removed from the Pockels cell. This allows displacing in time the voltage pulse applied to the Pockels cell, in this manner also displacing in time the transmission pulse of the Pockels cell with an analyzer located behind the Pockels cell. Thus it is possible to individually control the amplitude of selected laser pulses. The switching unit can either be a simple push-pull circuit or a bridge circuit made from two push-pull circuits.

19 Claims, 6 Drawing Sheets

CONTROLLING POCKELS CELLS

CROSS REFERENCE TO RELATED APPLICATION

The present application claims priority under 35 U.S.C. §119 to German Patent Application No. DE 10 2005 061 716, filed on Dec. 22, 2005. The contents of the prior application are hereby incorporated by reference in their entirety.

TECHNICAL FIELD

This invention relates to controlling Pockels cells, to systems and methods relating to such cells, and to methods of producing and controlling short or ultrashort laser pulses.

BACKGROUND

Commonly used devices for switching laser pulses are optical switches or modulators placed in the beam path within or outside of a laser resonator. Optical modulators include both electro-optical modulators and acousto-optical modulators. An important parameter for selecting the type of modulator is the attainable switching time. Using acousto-optical modulators, the switching time is determined by the speed of sound and the diameter of the laser beam. In some cases these parameters render the attainable switching speed too slow for a number of applications, such as suppressing pre- or post-pulses to a laser pulse that is extracted from an optical cavity. Electro-optical modulators have faster switching speeds and have in recent time been improved, now also allowing the high repetition rates that are attainable with acousto-optical modulators.

As their main element, common electro-optical modulators use a Pockels cell with variable optical properties, and an element sensitive to the polarization direction of the light beam, such as a reflective analyzer with constant optical properties. A Pockels cell normally comprises a birefringent crystal, which is suitably oriented with respect to the propagating light beam and to which a voltage of a few hundred to a few thousand volts is applied for changing the polarization of the incident light beam. Combined with the polarization sensitive element, these elements can be used for switching the light beam propagating through these elements on and/or off, of for changing the path of the light beam by optical element that are sensitive to the polarization of the incident light beam.

Using a suitable high voltage supply that can be switching between two voltage values the Pockels cell can switch the propagating laser beam between two orthogonal states of polarization. The difference of these two voltage values is a function of the parameters of the crystal material that is used and the wavelength of the propagating laser beam to be switched. In some applications both transitions from high to low voltage and vice versa must take place within a few nanoseconds, while some other applications only require one of the transitions to be as fast as a few nanoseconds, whereas the other transition can take place also in a time of microseconds.

Such an electro-optical modulator with a Pockels cell and a switchable high voltage supply can be used to optically switch laser pulses of short duration such as a few nanoseconds (ns), or ultrashort duration such as picoseconds (ps) or femtoseconds (fs), either changing their intensity or their propagation path. Such ultrashort laser pulses can be generated by known principles such as mode locking, Q-switching or gain switching. Mode-locked laser pulses usually have high repetition rates above 1 MHz, typically from 40 MHz to 200 MHz, for solid state lasers, and low pulse energies in the order of nanojoules, typically from 0.1 nJ to 50 nJ. If it is necessary to extract single laser pulses or groups of laser pulses from a continuous ps or fs pulse trains, it is often advantageous to use Pockels cells for this purpose. To do this, the voltage applied to the Pockels cell must be switched completely on or off in the time interval between two pulses, which is typically between 5 ns and 25 ns.

Often ultrashort laser pulses of significantly higher energy than mode-locked laser pulses (e.g., 1,000-fold to 100,000-fold) are necessary for applications such as material processing or nanolinear optical science. In this case, the extracted mode-locked laser pulses are injected into an optical amplifier, passing its amplifying stage the number of times necessary to achieve the desired energy level.

German Patent No. DE 102 51 888 B4 discloses an electrical control for Pockels cells and a laser system employing a Pockels cell with such an electrical control for selecting laser pulses. The electrical control has been modified from the commonly known H-configuration by adding at lest one high voltage switch. This switch can either replace the commonly used recharging resistor or be placed in parallel to it. Such an electrical control can efficiently select individual laser pulses, allowing the precise generation of pulse sequences with defined time intervals for certain applications.

The amplitude of a laser pulse transmitted through an electro-optical modulator is controlled by the amplitude of the voltage signal applied to the Pockels cell. The voltage amplitude can only be varied in time scales in the order of milliseconds. In this way, it is not possible to control the amplitude of consecutive laser pulses, which is desired for certain applications such as material processing.

SUMMARY

Some aspects of the invention feature a controllable Pockels cell system that allows for a particularly fast amplitude variation of laser pulses. In many cases, this Pockels cell system can enable precisely determined amplitudes of individual laser pulses in a pulse train of laser pulses.

In some respects, various embodiments of the present invention can achieve a variable amplitude modulation of the propagating laser pulses without using an extra modulator, while using a generally constant value for the maximum amplitude of the high voltage applied to the Pockels cell system. This improves upon some known Pockels cell systems by providing means for modifying the switching time when the high voltage is applied to the Pockels cell.

One aspect of the invention features a controllable Pockels cell system including a switching unit for switching the high voltage applied to the Pockels cell and off, and a delay unit for modifying the time when the high voltage is switching on and/or off.

In some embodiments, a polarization selective element, such as reflective analyzer, is placed behind or downstream of the Pockels cell, as viewed along the beam path of the laser. These two elements (Pockels cell and analyzer) together form the electro-optical modulator. The polarization of the linear polarized laser pulse passing the Pockels cell is orthogonal to the orientation of the polarization selective element behind the Pockels cell, such that the laser pulse is not transmitted. When a high voltage is applied to the Pockels cell, the polarization of the laser pulse will be rotated by 90°, allowing it to pass through the polarization selective element. In this manner, applying a well defined voltage to the Pockels cell as a function of time will change the transmission of the electro-optical modulator in a well defined function of time. This well defined transmission versus time function will be applied synchronously with the impinging laser pulses to the Pockels cell, synchronous to every laser pulse, for example, to every second laser pulse or to every nth laser pulse.

The transmission versus time function of the electro-optical modulator has, in some examples, at least one edge that is displaced in time relative to the impinging laser pulses, thus achieving the desired transmission for these laser pulses. For switching short and ultrashort laser pulses the transmission versus time function should be slow enough to be essentially constant during the time span of the laser pulse. Any desired intensity (amplitude) of the transmitted laser pulse can then be attained by displacing the edge of the transmission versus time function with respect to the laser pulse. A high repetition rate laser system with such as amplitude control for individually transmitted laser pulses can favorably be used for material processing, such as drilling holes or grooves with single laser pulses, specifically with respect to their depths or widths, etc.

The transmission versus time function of the electro-optical modulator can have a rising edge and a falling edge that can both be used for setting the intensity (amplitude) of the transmitted laser pulses. If one of the transition times is slower that the other one, this edge may favorably be used for the intensity control, as a slower edge will allow for a more precise determination of the transmitted intensity. One or both of the edges may deliberately be slowed down for this purpose.

In some embodiments, the switching unit applying a switchable high voltage to the Pockels cell is or includes a push-pull circuit. A first potential, such as a positive high voltage terminal, is connected via a first switch to a node, which is connectable to a first connector of the Pockels cell. This node is connected to a second potential, such as a ground terminal, via a second switch. The Pockels cell can also be connected to the second potential. The delay unit can be connected to the push-pull-circuit, and can include an input port for a trigger single and a first and a second output port for control signals, with the first output port connected to the first switch and the second output port connected to the second switch. The delay unit receives a trigger signal and generates control signals to the first and second switches. Preferably, the delay unit can be controlled in such a way that the control signals emanating from the output ports have individually set and controlled delays.

If the first potential is a positive high voltage terminal, the second potential can also be a negative high voltage terminal instead of a ground terminal.

Preferably the delay unit can be controlled by an analog signal that determines the time delay of the control signal(s) through the delay unit.

A more complex embodiment can include two push-pull circuits for the electrical control of Pockels cells in a bridge- or H-configuration. A first potential, such as a positive high voltage terminal, is connected via a first switch to a first node, which is connectable to the Pockels cell, whereas this first potential is connected via a second switch to the Pockels cell. The first node is connected via a third switch to a second potential, such as a ground terminal, while the second node is connected via a fourth switch to the second potential.

The delay unit can be connected to either of the push-pull circuits. If it is connected to the first push-pull circuit, such as to the first and second switch, it will modify the time delays of the control signals controlling these two switches. If it is connected to the second push-pull circuit, it will modify the time delays of the control signals controlling the third and fourth switches. The delay unit can have an input port for a trigger signal and first and second output ports for control signals. If the delay unit is connected to the second push-pull circuit, the first output port is connected to the third switch and the second output port is connected to the fourth switch. The delay unit can be controlled in a way that the control signals emanating from the output ports can be delayed by the same time delay.

Likewise, in this more complex embodiment, the second potential may be, instead of a ground terminal, a negative high voltage terminal, while the first potential is a positive high voltage terminal.

Some embodiments include a second delay unit connected to the other of the push-pull circuits. Thus, by using two delay units, the switching times of all four switches may be modified by analog signals with individually set and controlled delays. The time delay of control signal from the first delay unit is controlled by a first analog signal applied to the first delay unit, and the time delay of control signals from the second delay unit is controlled by a second analog signal, applied to the second delay unit.

Another aspect of the invention features a laser system for producing short or ultrashort laser pulses. This laser system is equipped with an electro-optical modulator as discussed above. This electro-optical modulator can be placed within or outside of the laser resonator.

Another aspect of the invention features a method of producing short or ultrashort laser pulses of variable amplitude. According to this method, a pulse train of laser pulses is directed towards an electro-optical modulator as described above. A laser pulse is selected by the electro-optical modulator and is directed to a first output port of the electro-optical modulator. One of these laser pulses is selected by temporal coincidence of its arrival at the electro-optical modulator with the edges of the control voltage pulse of the Pockels cell. The amplitude of this laser pulse is adjusted by the temporal relationship of these two events.

The amplitude may be controlled by temporal coincidence of the voltage pulse applied to the Pockels cell with the arriving laser pulse. The time of the rising of falling edge of the voltage pulse may be positioned such as to achieve the desired amplitude of the transmitted laser pulse.

Another aspect of the invention features a method of controlling the amplitude and/or energy of short or ultrashort laser pulses via a closed feedback loop. According to this method, a pulse train of laser pulses is directed towards an electro-optical modulator as described above, a laser pulse is selected by the electro-optical modulator and directed to a first output port of the electro-optical modulator. The amplitude and/or energy of the laser pulse is measured at some location of the laser system, and this or later-arriving laser pulses pass through the electro-optical modulator as described herein, where their amplitude is set to the desired value.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Figure 1A:
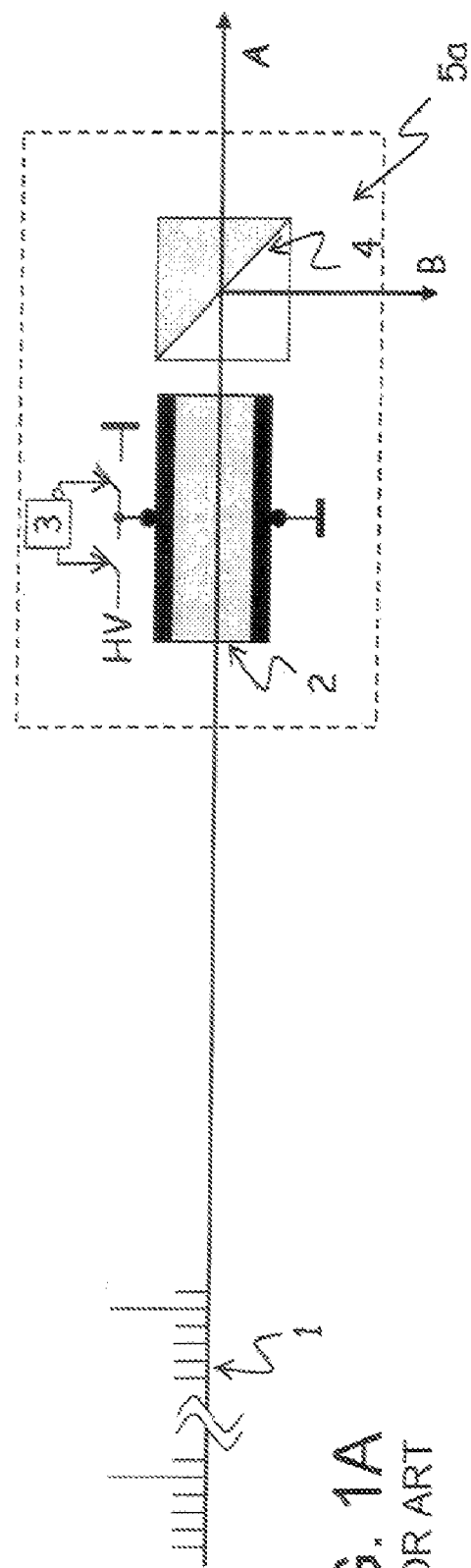
FIGS. 1A and 1B shown prior art electro-optical modulators.

FIG. 1A shows a known electro-optical modulator 5a modulating a pulse train 1 of laser pulses passing a Pockels cell 2. Applying a high voltage HV via a high voltage switch 3 the crystal of the Pockels cell 2 turns birefringent, resulting in part of the laser radiation passing through the analyzer 4 to port A, another part to port B, depending on the voltage level. Varying the voltage HV applied to the Pockels cell 2 from zero to half-wave voltage $V_{\lambda/2}$ will vary the polarization state of the pulse train 1 exiting from the Pockels cell from linearly horizontally polarized (p-polarized, passes the analyzer 4 to port A) through elliptically polarized to linearly vertically polarized (s-polarized, is reflected by the analyzer 4 to port B).

Figure 1B:
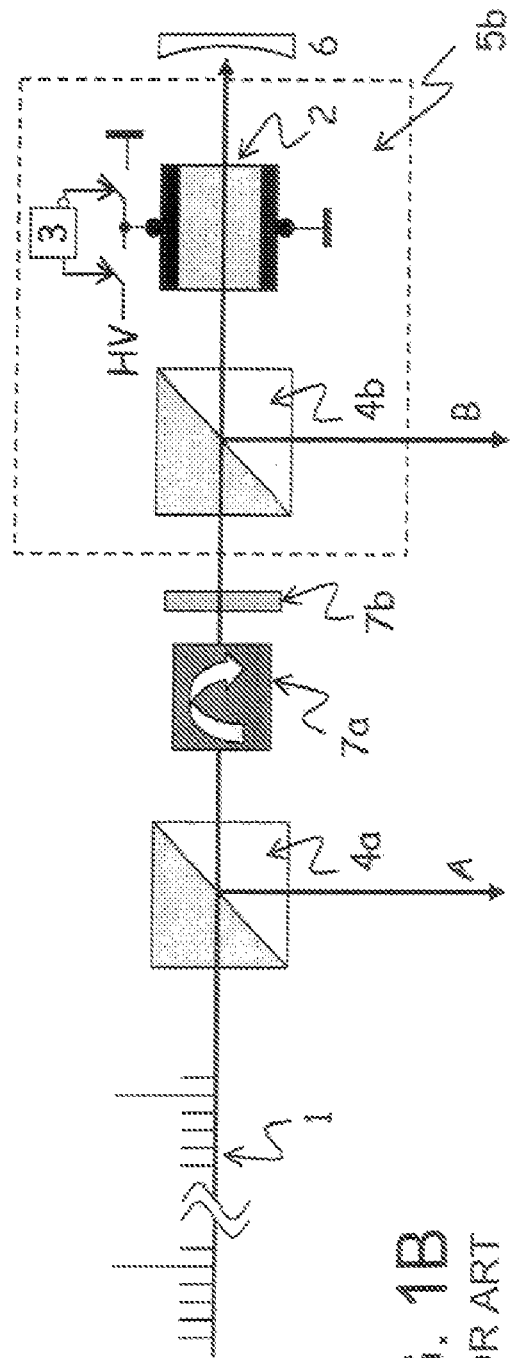

FIG. 1B shows another known electro-optical modulator 5b that can achieve the maximum modulation of the incoming p-polarized pulse train 1 with only half the applied voltage, because the Pockels cell 2 is passed a second time after the pulse train 1 is reflected back from a mirror 6. Thus, the p-polarization of the incoming pulse train 1 is rotated by 90° by only applying quarter-wave voltage $V_{\lambda/4}$ to the Pockels cell 2 and the laser pulses leave the electro-optical modulator 5b s-polarized after reflection from analyzer 4b via port B. Without applying voltage to the Pockels cell 2 the pulse train 1 runs back through a Faraday rotator 7a and a half-wave plate 7b to an input polarizer 4a. Passing the Faraday rotator 7a and the half-wave plate 7b in the forward direction, their effect is mutually compensated, while passing them in the reverse direction, the polarization will be rotated by 90°. The Faraday rotator 7a, half-wave plate 7b and polarizer 4a thus form an optical diode.

As an example, the Pockels cell 2 can be a transverse electro-optical beta barium borat (BBO) crystal, properly positioned in the polarized laser beam for transverse electro-optical switching. Applying voltage to this crystal will produce a phase shift between two orthogonal polarization components, producing a transmission through an analyzer positioned behind the Pockels cell 2 that varies from 0% to 100% according to $\sin^2(\Pi/2 \cdot V/V_{\lambda/2})$ when changing the high voltage HV.

Figure 2:
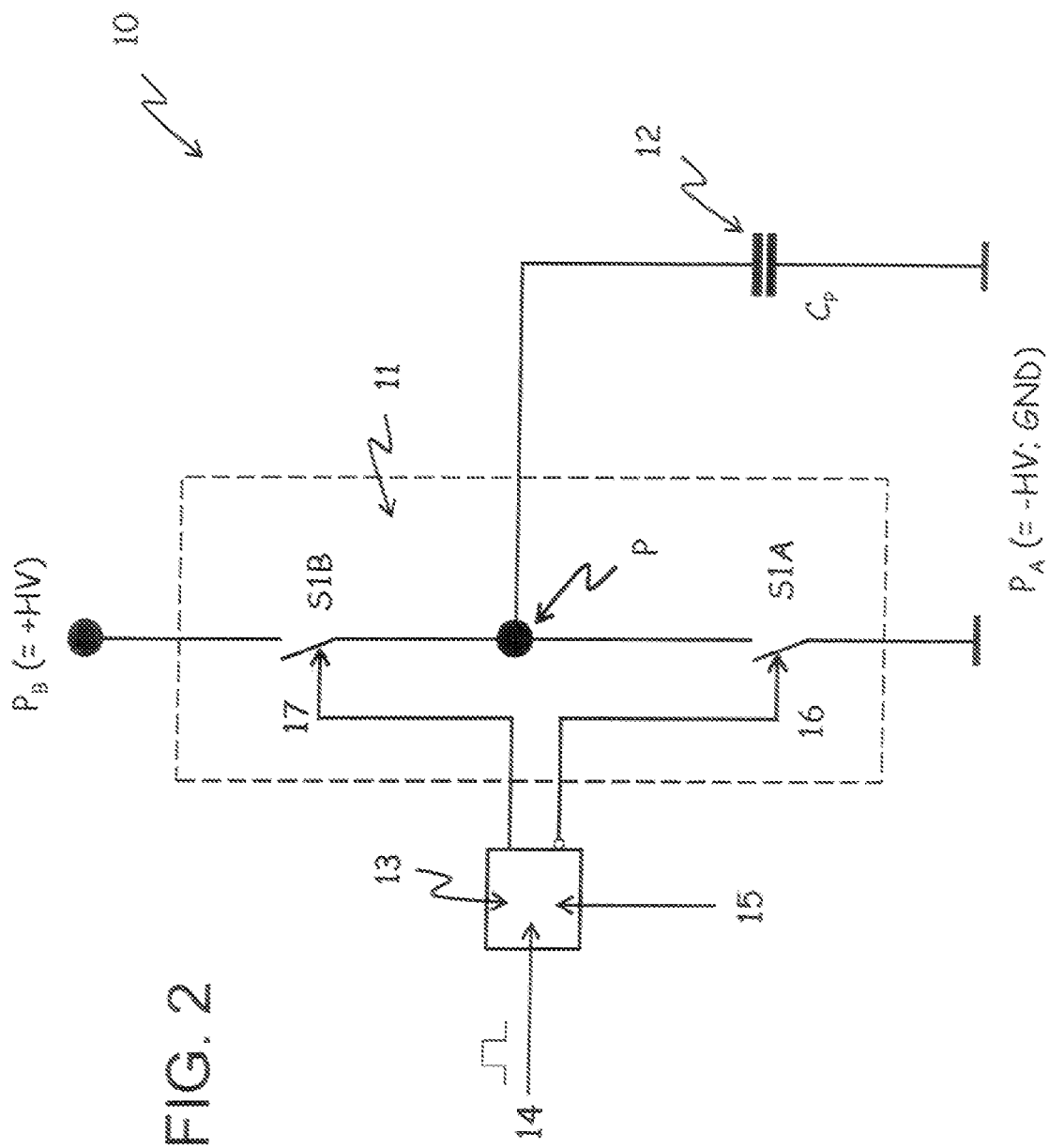
FIG. 2 shows a controllable Pockels cell system including a push-pull circuit and a delay unit.

FIG. 2 shows a controllable Pockels cell system 10. The Pockels cell system 10 includes a Pockels cell 12 and a controller operably connected to the Pockels cell 12 and including a switching unit 11 and a delay unit 13. The switching unit 11 is connected to the Pockels cell 12, to a high voltage terminal +HV (first potential $P_B$) and to a second potential $P_A$, e.g. a ground terminal. The Pockels cell 12 is likewise connected to the second potential $P_A$. The ground terminal can be replaced by a high voltage terminal –HV, with opposite polarity to the high voltage terminal +HV. Assuming that +HV represents a positive high voltage terminal, the ground terminal can be replaced by a negative high voltage terminal –HV.

The switching unit 11 includes a push-pull circuit with a first switch S1B, connected to the high voltage terminal +HV and a node P, and a second switch S1A. The node P is connected to the Pockels cell 12 and to the second switch S1A. The second switch S1A is connected to the ground terminal (potential $P_A$).

The switches S1A and S1B are operated in a well known alternating sequence to apply a substantially rectangular high voltage pulse to the Pockels cell 12. This alternating sequence is known from German Patent No. DE 102 51 888 B4 in conjunction with its FIGS. 2a and 2b, the contents of which patent are incorporated herein by reference. The high voltage pulses are generated at either the same repetition rate as the laser pulses or at a rate that is the $N^{th}$ (N=integer number) divider of that rate, e.g. every $N^{th}$ laser pulse of a pulse train of laser pulses is to be selected. A rising edge of the high voltage pulse is produced by simultaneously closing the first switch S1B and opening the second switch S1A, applying the high voltage to the Pockels cell 12. A falling edge of the high voltage pulse is produced by simultaneously closing the second switch S1A and opening the first switch S1B, discharging the electrical charge stored in the Pockels cell 12.

Delay unit 13 is connected to the first switch S1B and the second switch S1A of the push-pull circuit 11. The delay unit 13 receives a trigger signal 14 and generates control signals applied to the first and second switches S1B and S1A. The first control signal 16 actuates the second switch S1A and the second control signal 17 actuates the first switch S1B. The trigger signal 14 can be generated by known state-of-the-art methods and means. The delay unit 13 generates control signals 16 and 17 with individually controllable time delays for each control signal. The time delays are controlled by an analog signal 15, which is applied to the delay unit 13. The analog signal 15 can be generated by known D/A converters, for example. The first control signal 16 activates the second switch S1A with a time delay compared to the second control signal 17 switching the first switch S1B. When the second control signal 17 closes the first switch S1B, the second switch S1A will be closed and no voltage is applied to the Pockels cell 12. The voltage is switched on to the Pockels cell 12 when the first control signal 17 opens the second switch S1A. The voltage or charge is removed from the Pockels cell 12 by opening the first switch S1B and with a time delay closing the second switch S1A.

The delay unit 13 produces an arbitrary temporal displacement between the high voltage pulse applied to the Pockels cell 12 and the incoming laser pulse. For example, the voltage pulse can be shifted by the analog signal 15 so that the laser pulse coincides with the falling edge of the voltage pulse. The voltage pulse corresponds to a transmissivity pulse for the laser beam that passes an analyzer positioned behind or downstream of the Pockels cell 12. A high transmission for the laser pulse can be achieved by positioning the voltage pulse such that the voltage maximum coincides with the incoming laser pulse. A low transmission can be achieved by shifting the voltage pulse with the delay unit 13 in a manner that the laser pulse passes the Pockels cell 12 at a time when the analyzer has the desired transmission. Since the edges of such high voltage pulses are usually quite fast, it is possible to deliberately slow them down, either by adding resistance to the circuit from the node P to the ground terminal. Alternatively this can also be done by adding capacitance to the circuit or by increasing the self-capacitance of the switch S1A or the capacitance of the Pockels cell 12.

The analog signal 15 controlling the time delay generated by the delay unit 13 can be changed very rapidly, thus allowing different time delays from one laser pulse to the next laser pulse of the pulse train, allowing one to control and vary the amplitude of each individual laser pulse selected by the Pockels cell 12.

Figure 3:
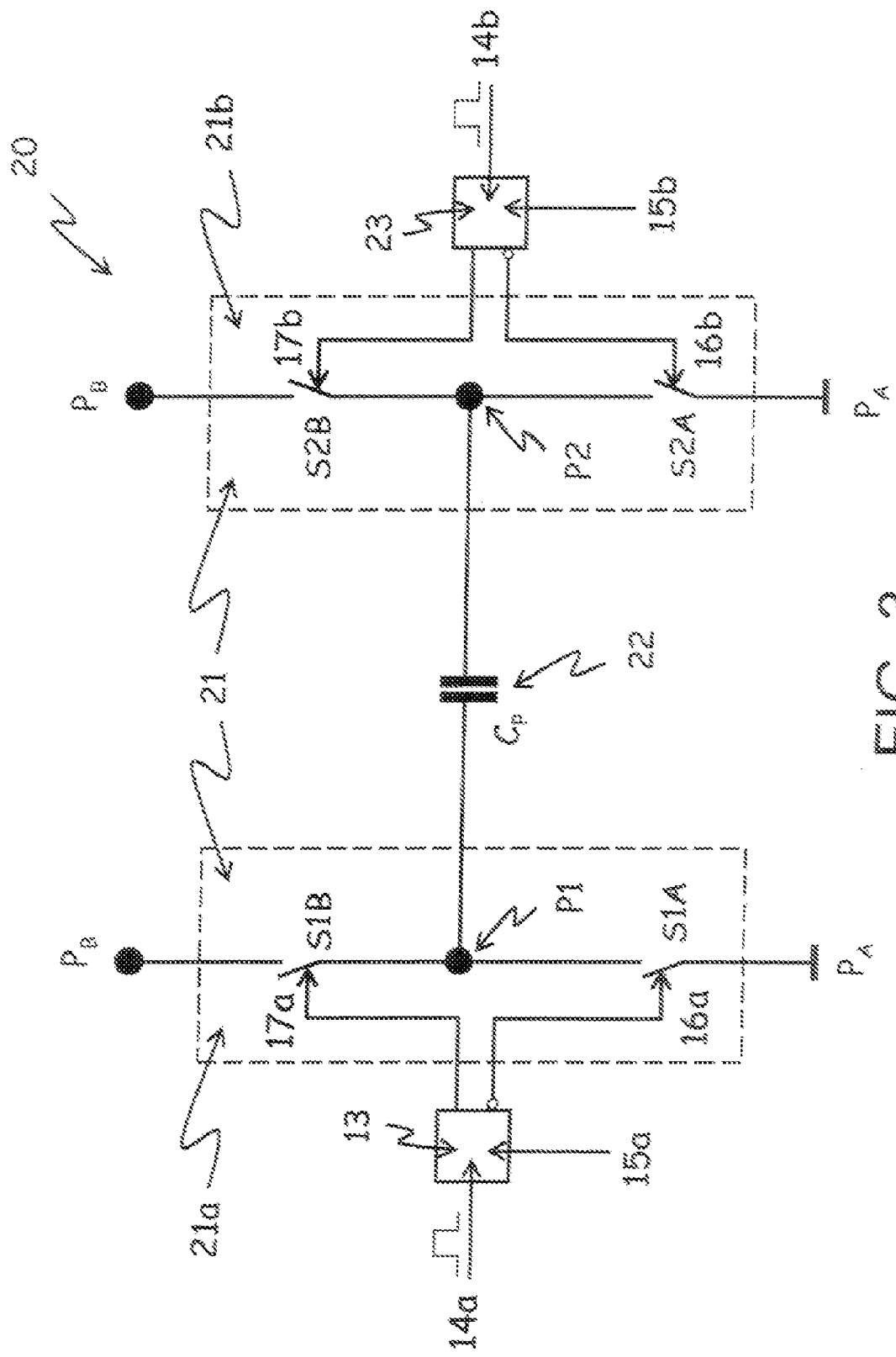
FIG. 3 shows a controllable Pockels cell system including two push-pull circuits and two delay units.

FIG. 3 shows another controllable Pockels cell system 20. This Pockels cell system 20 includes a Pockels cell 22, a switching unit 21 and first and second delay units 13 and 23. The switching unit 21 has a double push-pull circuit 21 including a first push-pull circuit 21a and a second push-pull circuit 21b. A double push-pull circuit is known from German Patent No. DE 102 51 888 B4 and its FIGS. 4, 5a and 5b. The contents of this other German patent are also incorporated by reference herein.

The Pockels cell 22 is connected to a first node P1 of the first push-pull circuit 21a and a second node P2 of the second push-pull circuit 21b. The first node P1 is connected via first switch S1B to a first potential $P_B$ (high voltage terminal +HV) and via a second switch S1A to a second potential $P_A$ (e.g. ground terminal). The second node P2 is connected via a third switch S2B to the first potential $P_B$ and via a fourth switch S2A to the second potential $P_A$. Like in the system of FIG. 2, the ground terminal can be replaced by a high voltage terminal −HV of opposite polarity as high voltage terminal +HV.

The voltage is applied to or removed from the Pockels cell 22 by operating the first and second switches S1B and S1A and likewise the third and fourth switches S2B and S2A in a push-pull manner, such as by simultaneously closing switch S1B and opening switch S1A, simultaneously closing switch S1A and opening switch S1B, or by simultaneously closing switch S2B and opening switch S2A, simultaneously closing switch S2A and opening switch S2B. The first and second switches S1B and S1A are controlled by a first trigger signal 14a, and the third and fourth switches S2B and S2A are controlled by a second trigger signal 14b. The voltage is applied to the Pockels cell 22 by closing switch S1B and opening switch S1A (first trigger signal 14a) and the voltage is removed from the Pockels cell 22 by applying the second trigger signal 14b to the third and fourth switches S2B and S2A.

Pockels cell system 20 includes a first delay unit 13 and a second delay unit 23. The first delay unit 13 is connected to the first and second switches S1B and S1A of the first push-pull circuit 21a. The first delay unit 13 receives a first trigger signal 14a and generates control signals 17a and 16a applied to the first and second switches S1B and S1A. The second delay unit 23 is connected to the third and fourth switches S2B and S2A of the second push-pull circuit 21b. The second delay unit 23 receives a second trigger signal 14b and generates control signals 17b and 16b applied to third and fourth switches S2B and S2A. The Pockels cell 22 is switched on by closing the first switch S1B and opening the second switch S1A, and the Pockels cell 22 is switched off by operating the third and fourth switches S2B and S2A. The first and second delay units 13 and 23 generate control signals with individually controllable time delays for each control signal. The time delays are controlled by analog signals 15a and 15b received to the delay units 13 and 23. The first analog signal 15a controls the time delay of control signals 16a and 17a, and the second analog signal 15b controls the time delay of control signals 16b and 17b.

The trigger signals 14a and 14b are digital signals, while the delay units 13 and 23 generate individually delayed control signals 17a, 16a, 17b and 16b for each of the four switches S1B, S1A, S2B and S2A. Any number of these four control signals can have variable delays controlled by variable analog signals 15a and 15b fed to the delay units 13 and 23, while the trigger signals 14a and 14b fixed delays.

The edges of the voltage pulses applied to the Pockels cell 22 can be shifted in time, or the voltage pulse applied to the Pockels cell 22 can be shifted as a whole. If the voltage pulse is shifted as a whole, the Pockels cell system 20 includes delay units 13 and 23, which receive the same analog signal.

Likewise, the voltage pulse applied to the Pockels cell 22 can be short, such as to have essentially triangular form, the laser pulse always passing the Pockels cell 22 when the voltage is maximal. The rising and falling edges of the voltage pulse can be shifted in opposite directions, effectively changing the maximum amplitude of the triangular voltage pulse, thus modifying the transmission of a laser pulse through an analyzer.

As with the system of FIG. 2, it is also possible to deliberately slow down the voltage edges by adding resistance in series to the Pockels cell 22 or in series to the switches S1A, S1B, S2A, S2B, or by adding capacitance in parallel to the Pockels cell 22 or to any one of the switches.

Figure 4:
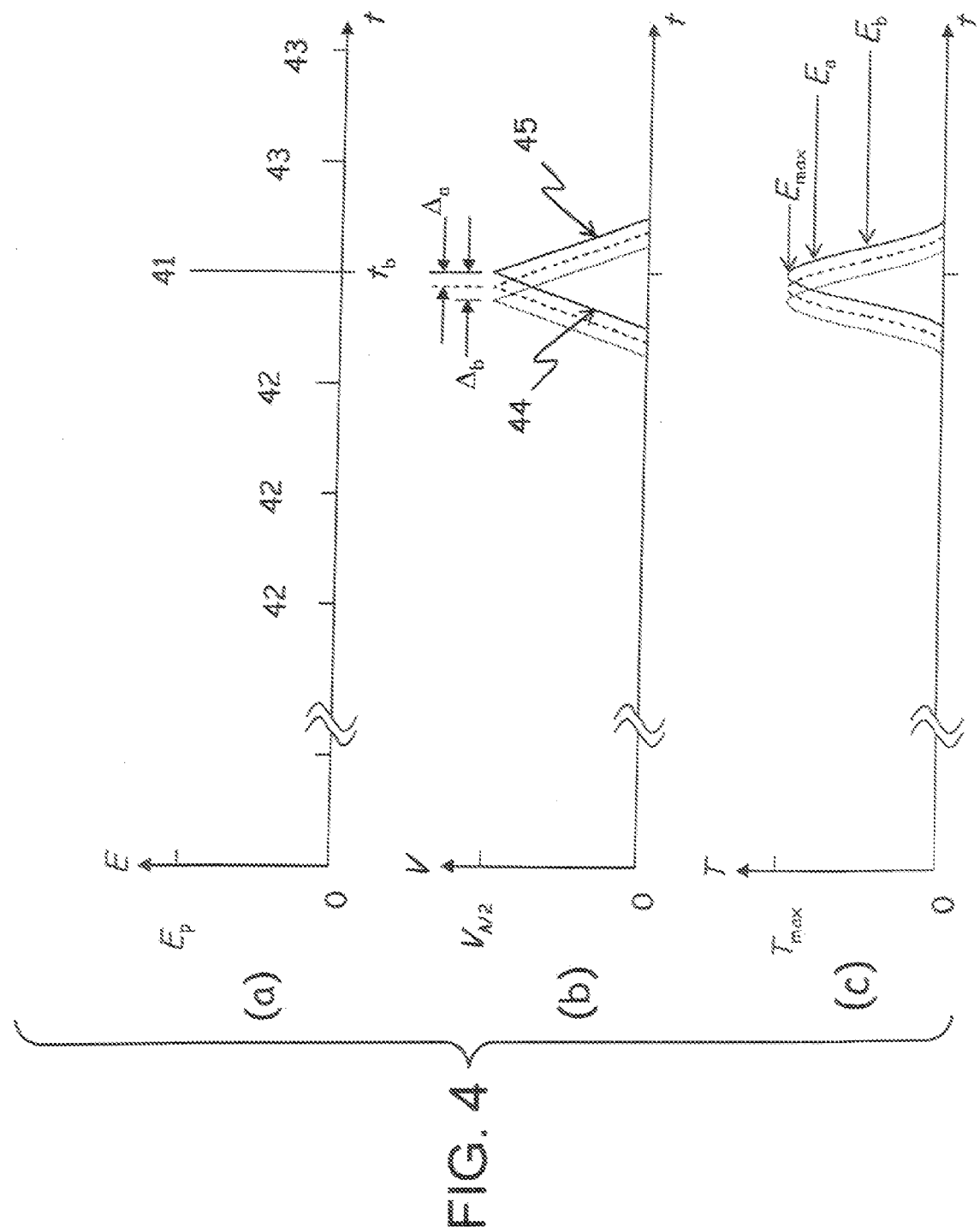
FIG. 4 shows timing diagrams of laser pulses (a), voltage pulses (b) and transmission function (c) for triangular voltage pulses.

FIG. 4 shows timing diagrams to demonstrate the pulse amplitude control by applying symmetrical triangular voltage pulses to the Pockels cell 12 and 22.

Graph (a) of FIG. 4 shows a single laser pulse 41 arriving at time $t_b$ with pre-pulses 42 and post-pulses 43. This laser pulse 41 at time $t_b$ with energy $E_P$ is to be selected by the Pockels cell 12 and 22 and its amplitude is to be set to the desired value by the Pockels cell system 10 and 20.

Graph (b) of FIG. 4 shows a timing diagram for the voltage pulses applied to the Pockels cell. They are depicted as triangular in shape with linearly rising and falling edges 44 and 45 (continuous line). These edges can be deliberately slowed down, for example more than 15 ns, to reduce the effect of unavoidable jitter in the synchronization of laser pulse with voltage pulse by reducing the slope of the voltage versus time function. Typically the precision of the pulse amplitude should be less than 5% (or 2%), assuming a typical timing jitter of 250 ps will give a maximum allowable slope for the voltage versus time function. For clarity, two delayed voltage pulses are shown, which are displaced by time delays $\Delta_a$ and $\Delta_b$ (dashed lines).

Graph (c) of FIG. 4 shows a timing diagram for the transmission versus time function of the Pockels cell and the analyzer. The continuous line shows the transmission function when the voltage pulse is not shifted in time. In this case the laser pulse passes the Pockels cell at the instant of maximum transmission $T_{max}$, leaving it with the maximum pulse energy $E_{max}$. The dashed lines show transmission pulses that have been delayed with time delays $\Delta_a$ and $\Delta_b$, resulting in lower transmitted pulse energies of $E_a$ and $E_b$.

These time delays can be set very rapidly and precisely, allowing the pulse amplitudes of individual laser pulses to be set even at high repetition rates above 10 kHz.

Figure 5:
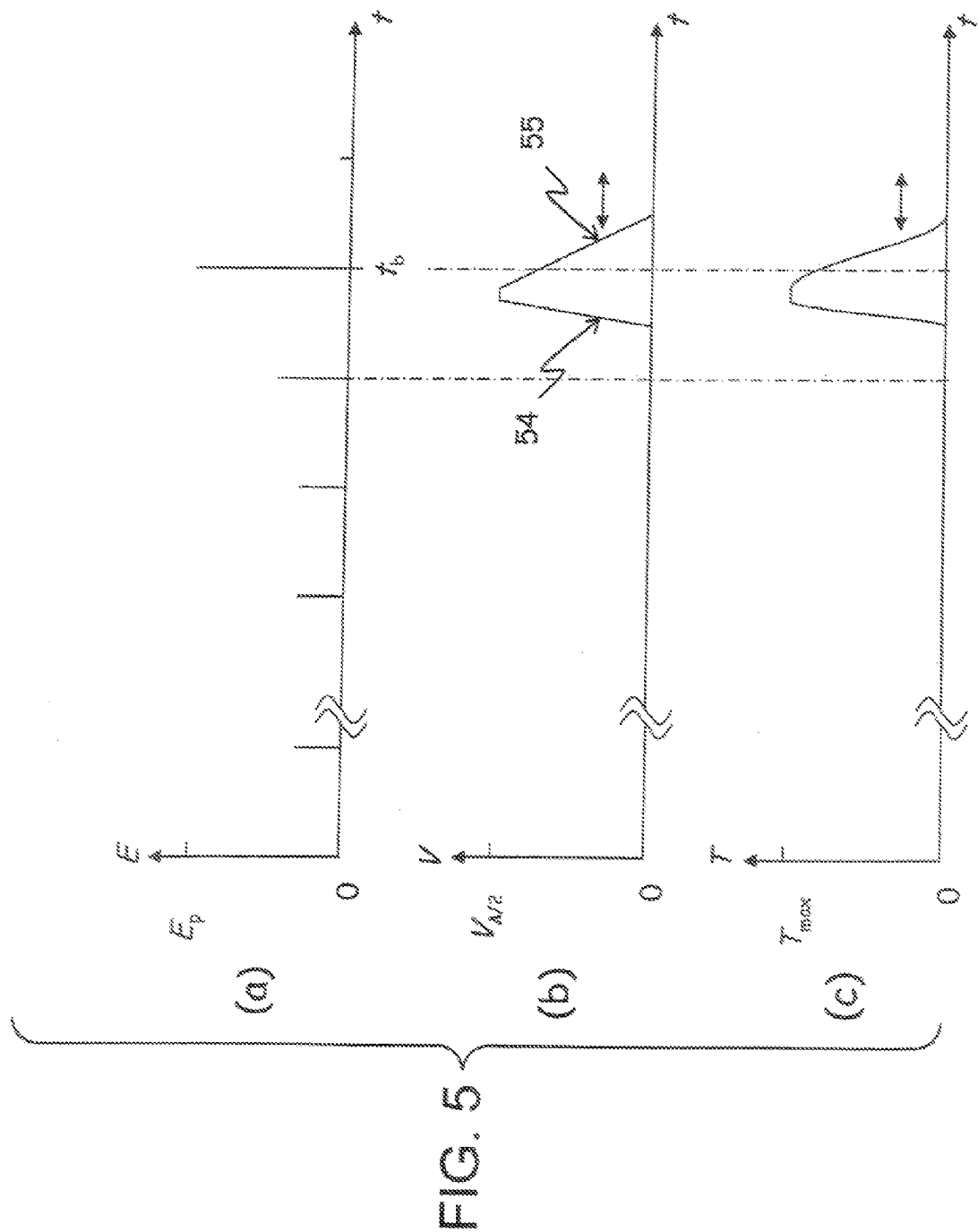
FIG. 5 shows timing diagrams of laser pulses (a), voltage pulses (b) and transmission function (c) for asymmetrical voltage pulses.

FIG. 5 shows timing diagrams with asymmetrical voltage pulses for the electrical control 10 and 20 of the Pockels cell 12 and 22. This example shows the falling edge 55 to be slower than the rising edge 54 of the voltage pulse. The rising and falling edges of the voltage pulse can be made slower, such as by adding resistance in series to the Pockels cell, by adding capacitance in parallel to the Pockels cell, increasing self-capacitance of the switches, or other known methods.

It is also possible to modulate a pulse train of laser pulses by the electro-optical modulators together if the laser pulses are closely enough spaced in time and have energies of similar dimension.

A controllable Pockels cell system can also be used to make a feedback loop for setting the energy and/or amplitude of laser pulses produced by a laser system. This can be done, for example, by measuring the energy of laser pulses when they leave the resonator or at some other location within the laser, comparing this value with some stored value, and shifting the voltage pulse applied to the Pockels cell according in time. When the measured value of pulse energy and/or pulse amplitude is too high, the transmission of the electro-optical modulator must be reduced to reduce the energy and/or amplitude of the laser pulses, when the measured value is too low, the transmission of the electro-optical modulator must be increased.

Figure 6:
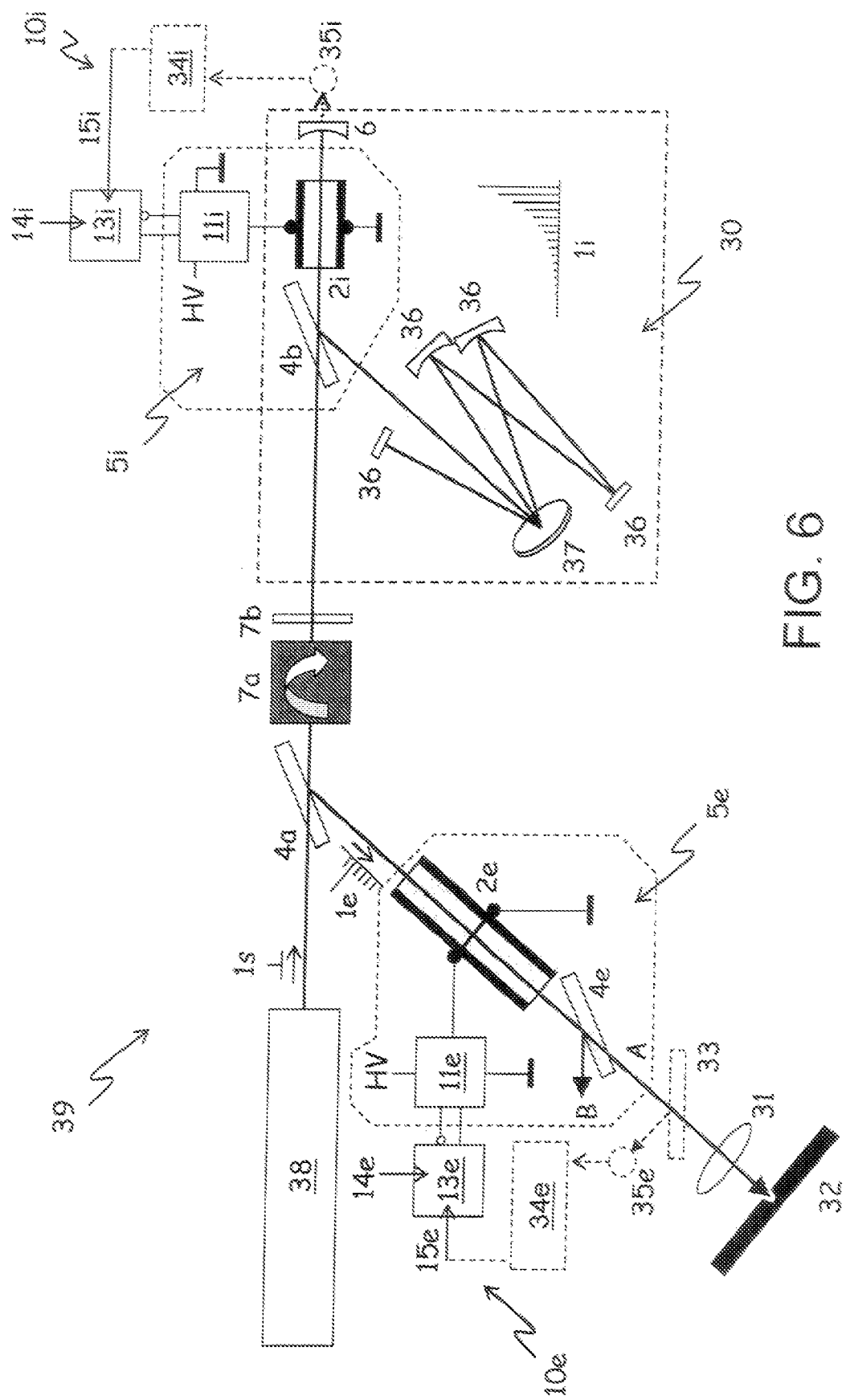
FIG. 6 shows a laser system including a controllable Pockels cell system.

FIG. 6 shows a laser system 39 with adjustable amplitude control. A laser oscillator 38 generates a pulse train 1s of laser pulses, of which one can be injected into the amplifier 30 by an assembly as shown in FIG. 1. This amplifier can by of any type, linear or regenerative. FIG. 6 shows a regenerative thin-disk amplifier.

This type of low-gain, regenerative amplifier, controllable Pockels cell system can be particularly advantageous as compared to an acousto-optical modulator. Since the polarizer 4b can never be perfect, before the amplified pulse is extracted from the resonator, there will be a pulse train of pre-pulses leaking through this polarizer, with each amplified pulse reflected back. This effect will be detrimental in low-gain amplifiers because the amplified pulse will have a high energy already some time before it is extracted. Slow modulators are generally not capable of suppressing these pre-pulses.

The regenerative thin-disk amplifier 30 shown in FIG. 6 consists of an injection/extraction-unit made from a polarizer 4b, a Pockels cell 2i, an end mirror 6, a number of resonator mirrors 36, and an amplifying element like a thin-disk element 37 shown here. These types of amplifiers are, as an example, described in the German Application No. DE 10304401A1, the contents of which are incorporated herein by reference.

After passing the amplifying element 37 a sufficient number of times, the laser pulse 1e is extracted, and after passing the half-wave plate 7b and the Faraday rotator 7a is reflected by polarizer 4a. This extracted laser pulse and the perhaps also existent pre- and post-pulses 1e pass an external electro-optical modulator 5e made from a dual crystal Pockels cell 2e and another polarizer 4e and controlled by controllable Pockels cell system 10e for the Pockels cell 2e. The Pockels cell system 10e includes a delay unit 13e and a high voltage switching unit 11e and is operated in a way analogous to FIG. 2 to suppress the pre- and post-pulses and to set the amplitude of the extracted laser pulse to the desired amplitude. The unwanted parts of the pulse train are reflected at polarizer 4e into beam dump B, where they can be absorbed.

The main pulse that has been selected by the external electro-optical modulator 5e leaves the optical path through polarizer 4e at port A and is directed to a workpiece 32. In this manner, it is possible to process this workpiece 32 with individually defined laser pulses.

A small part of the laser pulse can be reflected onto a director 35e by a beam splitter 33. The signal from this detector 35e can then be compared to a set point value, the deviation from the set point value being used in a closed loop control 34e to set the analog signal 15e controlling the delay unit 13e.

An analogous feedback loop control can be set up with an electro-optical modulator 5i within the laser resonator. The measurement of the pulse amplitude can be done, using the weak signal leaked by the resonator mirrors (end mirror 6) hitting a detector 35i, which can then be processed in a closed loop control 34i.

The laser oscillator 38 can be protected by an extra optical diode, and the repetition rate of pulses coming from the laser oscillator 38 can be reduced with an extra pulse picker, as described in German Application No. DE 10304401A1, the contents of which are also incorporated by reference.

A laser system with a short or ultrashort pulse laser and an external electro-optical modulator as disclosed herein can be used to do material processing with individually set and controlled laser pulses. In a more general manner, it is also possible to precisely set a pulse train of laser pulses, such that this pulse train of laser pulses provides the desired result when processing a workpiece.

It is to be understood that while the invention has been described in conjunction with the detailed description of multiple examples, the foregoing description is intended to illustrate and not limit the scope of the invention, which is defined by the scope of the appended claims. Other aspects, advantages, and modifications are within the scope of the following claims.

What is claimed is:

1. A controllable Pockels cell system comprising
a Pockels cell; and
a controller operably connected to the Pockels cell, the controller including
a switching unit operable to switch a voltage applied to the Pockels cell, to switch the Pockels cell on and off; and
a delay unit that delays switching of the Pockels cell by a controllable time delay,
wherein the switching unit comprises a push-pull circuit and the push-pull circuit comprises a first switch connected to both a first potential and a node, and a second switch connected to both a second potential and the node;
wherein the delay unit is connected to both the first and second switch of the push-pull circuit; and
wherein the Pockels cell is connectable to the node and to the second potential.

2. The system of claim 1, wherein the delay unit is connected to both the first switch and the second switch, and wherein the delay unit receives a trigger signal and generates respective control signals to the first and second switches with individually controllable time delays for each control signal.

3. The system of claim 2, wherein the delay unit is controllable to generate equal time delays for both control signals.

4. The system of claim 1, wherein the time delay is controlled by an analog signal applied to the delay unit.

5. A controllable Pockels cell system comprising
a Pockels cell; and
a controller operably connected to the Pockels cell, the controller including
a switching unit operable to switch a voltage applied to the Pockels cell, to switch the Pockels cell on and off; and
a delay unit that delays switching of the Pockels cell by a controllable time delay,
wherein the switching unit comprises a first push-pull circuit and a second push-pull circuit.

6. The system of claim 5, wherein the first push-pull circuit comprises a first switch connected to both a first potential and a first node, and a second switch connected to both a second potential and the first node;
wherein the second push-pull circuit comprises a third switch connected to both the first potential and a second node, and a fourth switch connected to both the second potential and the second node;
wherein the delay unit is a first delay unit connected to one of the first and second push-pull circuits; and
wherein the Pockels cell is connected to the first node and to the second node.

7. The system of claim 6, wherein the first delay unit is connected to the third switch and to the fourth switch of the second push-pull circuit, and wherein the first delay unit is controllable to generate equal time delays for control signals to both the third and fourth switches.

8. The system of claim 6, comprising a second delay unit, which is connected to the other of the first and second push-pull circuits, wherein the first and second delay units are controllable to generate different delays for their respective control signals.

9. The system of claim 8, wherein time delay of control signals from the first delay unit is controlled by a first analog signal applied to the first delay unit, and wherein time delay of control signals from the second delay unit is controlled by a second analog signal, applied to the second delay unit.

10. A laser system comprising
a laser light source;
the Pockels cell system of claim 1, the Pockels cell arranged to intercept a beam of laser light from the light source; and
a polarizer arranged downstream of the Pockels cell, as seen along a beam path of the laser light.

11. The laser system of claim 10, wherein the laser light source comprises
a laser oscillator that produces laser pulses, and
a laser amplifier that amplifies the laser pulses produced by the laser oscillator.

12. The laser system of claim 11, wherein the laser amplifier comprises a regenerative laser amplifier.

13. A method for producing short or ultrashort laser pulses of variable amplitude, the method comprising:
directing a pulse train of laser pulses towards a device including
a Pockels cell,
a polarization-selective element arranged downstream the Pockels cell in the direction of propagation of light,
a controller operably connected to the Pockels cell includes
a switching unit operable to switch a voltage applied to the Pockels cell, to switch the Pockels cell on and/or off, and
a delay unit that delays switching on and/or off the Pockels cell by a controllable time delay,
applying a voltage pulse to the Pockels cell such that a rising or falling edge of the voltage pulse is applied to the Pockels cell at the time when a laser pulse to be selected arrives at the Pockels cell, thereby redirecting the selected laser pulse to a first port of the device, and
adjusting a desired amplitude of the selected laser pulse by altering a temporal relationship between the rising or falling edge of the voltage pulse and the selected laser pulse.

14. The method of claim 13, wherein the edge of the voltage pulse has a slope such that the transmission of the Pockels cell is essentially constant during the time span of the laser pulse.

15. The method of claim 13, wherein the voltage pulse at the Pockels cell is positioned temporally such that the laser pulse is shifted in time relative to the maximum of the voltage pulse and therefore to the transmission maximum of the Pockels cell.

16. The method of claim 13, wherein the voltage pulse has a triangular form with a linearly rising edge, an amplitude peak and a linearly falling edge.

17. The method of claim 13, wherein the voltage pulse has a symmetrical or asymmetrical pulse form.

18. The method of claim 13, wherein the pulse amplitude and/or the pulse energy of the selected laser pulse is detected and a control signal is generated based on the detection result, which is provided to the controller of the Pockels cell.

19. A laser system comprising
a laser light source;
the Pockels cell system of claim 5, the Pockels cell arranged to intercept a beam of laser light from the light source; and
a polarizer arranged downstream of the Pockels cell, as seen along a beam path of the laser light.

* * * * *

UNITED STATES PATENT AND TRADEMARK OFFICE
CERTIFICATE OF CORRECTION

PATENT NO. : 7,649,667 B2 Page 1 of 1
APPLICATION NO. : 11/615445
DATED : January 19, 2010
INVENTOR(S) : Bergmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Twenty-eighth Day of December, 2010

David J. Kappos
*Director of the United States Patent and Trademark Office*